US008621336B2

(12) United States Patent
Craske et al.

(10) Patent No.: US 8,621,336 B2
(45) Date of Patent: Dec. 31, 2013

(54) ERROR CORRECTION IN A SET ASSOCIATIVE STORAGE DEVICE

(75) Inventors: Simon John Craske, Cambridge (GB); Andrew Christopher Rose, Cambridge (GB); Paul Stanley Hughes, Sunnyvale, CA (US); Antony John Penton, Cambridge (GB); Richard York, Cambridge (GB); Simon Andrew Ford, Cambridge (GB); Stuart David Biles, Suffolk (GB); Alex James Waugh, Cambridge (GB)

(73) Assignee: ARM Limited, Cambridge (GB)

( * ) Notice: Subject to any disclaimer, the term of this patent is extended or adjusted under 35 U.S.C. 154(b) by 1500 days.

(21) Appl. No.: 12/222,085

(22) Filed: Aug. 1, 2008

(65) Prior Publication Data
US 2009/0044086 A1 Feb. 12, 2009

(30) Foreign Application Priority Data
Aug. 8, 2007 (GB) .................................. 0715480.0

(51) Int. Cl.
  *G06F 11/00* (2006.01)
(52) U.S. Cl.
  USPC ............................. 714/799; 714/25; 714/763
(58) Field of Classification Search
  USPC .................. 714/2, 6.1, 42, 48, 764, 768, 774
  See application file for complete search history.

(56) References Cited

U.S. PATENT DOCUMENTS

| 5,875,295 | A  | * | 2/1999  | Devic ............................... 714/52 |
| 6,351,789 | B1 | * | 2/2002  | Green ........................... 711/128 |
| 6,941,494 | B1 | * | 9/2005  | Andreev et al. ............... 714/718 |
| 2002/0016942 | A1 | * | 2/2002  | MacLaren et al. ............ 714/718 |
| 2004/0153607 | A1 |   | 8/2004  | Rowlands et al. |
| 2004/0215885 | A1 |   | 10/2004 | Cargnoni et al. |
| 2006/0179358 | A1 | * | 8/2006  | Cordero et al. ................. 714/47 |

OTHER PUBLICATIONS

Great Britain Search Report for GB 0715480.0, mailed Nov. 8, 2007.
D.J. Shippy et al. "Power2 Fixed-Point, Data Cache and Storage Control Units", (Sep. 1994), vol. 38 No. 5, pp. 503-524.

* cited by examiner

*Primary Examiner* — Sarai Butler
(74) *Attorney, Agent, or Firm* — Nixon & Vanderhye P.C.

(57) ABSTRACT

A data processing apparatus is provided comprising processing circuitry for performing data processing operations, a set associative storage device for storing data values for access by the processing circuitry when performing data processing operations, error detection circuitry for performing, for each access to the storage device, an error detection operation on the data value accessed, and maintenance circuitry associated with the storage device for performing one or more maintenance operations. The processing circuitry is arranged to issue an error detection maintenance request to the maintenance circuitry specifying at least one specific physical location within the storage device, and the maintenance circuitry is responsive to the error detection maintenance request to perform at least one dummy access to the at least one specific physical location within the storage device and to provide the processing circuitry with error status information derived from the error detection operation performed by the error detection circuitry in respect of said at least one dummy access.

15 Claims, 7 Drawing Sheets

ERROR CORRECTION IN A SET ASSOCIATIVE STORAGE DEVICE

This application claims priority to Great Britain Application No. 0715480.0 filed 8 Aug. 2007, the entire contents of each of which are hereby incorporated by reference.

BACKGROUND OF THE INVENTION

1. Field of the Invention

The present invention relates to set associative storage devices in data processing apparatuses, and in particular to mechanisms for correcting errors in the data values stored in such storage devices.

2. Description of the Prior Art

It is known that both soft and hard errors may manifest themselves in logic designs. In particular, such errors are known to particularly affect RAMs. In an attempt to combat this it is known to provide these components with error correction code (ECC), parity or other check mechanisms in order to allow the detection, and optionally correction, of errors that may occur.

Typically such a check and/or correct operation is only performed when a data value is directly accessed within the system. In a processor based system, this will typically be as a result of a load/store or instruction fetch operation. Note that the term "data value" is used here to refer to any stored value, whether data or an instruction. Thus, for example, when a processor accesses a given data value in a cache RAM, part of the access procedure in the cache RAM involves invoking a checking mechanism to verify (e.g. by reference to parity bits associated with the stored data value) whether an error has arisen in that stored data value. This checking mechanism may further take steps to automatically correct such an error (where this is possible), such that the correct data value is returned to the processor. Alternatively, the occurrence of the error may be reported to the processor, in particular where the correction of the error was not possible. The invocation of an error correction mechanism only when required by an access may result in certain RAM locations (and their associated check bits) remaining dormant and untested for a large period of time, thus increasing the chance that sufficient corruption may occur so as not to be correctable, or worse still undetectable.

One known approach which has been developed in realization of the problems that may result from some portions of a RAM remaining untested for an extended period of time uses a direct memory access (DMA) engine to perform accesses to the RAM in periods when it is not in use by the processor. These accesses exercise the error correction mechanism and thus correct any errors that are discovered. An example of this kind of approach is disclosed in "BIOS and Kernel Developer's Guide for the AMD Athlon™ 64 and AMD Opteron™ Processors", AMD, February 2006. Such "hardware scrub" approaches are expensive due to the need to provide a dedicated hardware engine, and lack flexibility since they operate according to a predefined algorithm, e.g. cycling through a set of memory addresses. Consequently, they are not particularly power-efficient.

In addition, it is known to arrange a cache RAM in a set-associative fashion. Whilst this has advantages for the storage and retrieval of data values in the cache (these advantages being known in the art and not being further discussed here), this also has the consequence that a data value stored in the cache may be stored in as many locations as there are ways in the cache, e.g. in a 4-way set associative cache there are four locations where a given data value may be stored. Thus, when the cache is addressed in terms of the memory addresses that may be cached there, some physical locations may rarely be used, depending on the manner in which the way is selected for a given memory address. Consequently for some physical locations in a set associative storage device (such as a cache) the error correction mechanism may be exercised less often than for others, increasing the likelihood of uncorrectable corruption of data values occurring.

The article "POWER2 Fixed-Point, Data Cache, and Storage Control Units" by IBM (available for download from the IBM website at the following URL: http://www-03.ibm.com/servers/eserver/pseries/hardware/whitepapers/power/fxu_3.html) discloses a software-controlled memory-scrubbing function. The software uses three registers to control the scrub function: a start address register, an end address register and a timer value register. Thus, this function also references the memory in terms of memory addresses, and hence will not operate effectively when used with a set-associative storage device.

Accordingly, it would be desirable to provide an improved error detection/correction mechanism which allows a more flexible, power efficient approach to how and when the mechanism for correcting errors in the data values stored in a set associative storage device is invoked.

SUMMARY OF THE INVENTION

Viewed from a first aspect, the present invention provides a data processing apparatus comprising: processing circuitry for performing data processing operations; a set associative storage device for storing data values for access by the processing circuitry when performing data processing operations; error detection circuitry for performing, for each access to the storage device, an error detection operation on the data value accessed; and maintenance circuitry associated with the storage device for performing one or more maintenance operations; wherein the processing circuitry is arranged to issue an error detection maintenance request to the maintenance circuitry specifying at least one specific physical location within the storage device, and the maintenance circuitry is responsive to the error detection maintenance request to perform at least one dummy access to the at least one specific physical location within the storage device and to provide the processing circuitry with error status information derived from the error detection operation performed by the error detection circuitry in respect of said at least one dummy access.

The present invention recognises the inefficiencies associated with the known prior art mechanisms for checking for errors in a set associative storage device. Instead, the present invention provides a mechanism by which the processing circuitry of a data processing apparatus may issue an error detection maintenance request to maintenance circuitry associated with the storage device, specifying at least one specific physical location within the storage device. The maintenance circuitry is responsive to this error detection maintenance request to perform at least one dummy access to the at least one specific physical location. When this dummy access is made the error detection circuitry associated with the storage device checks the validity of the data value stored at that at least one specific physical location and provides the maintenance circuitry with the result of this check. The maintenance circuitry can then provide the processing circuitry with error status information associated with the dummy access to the at least one specific physical location.

The standard method of accessing a set associative storage device, whether to access a data value or to perform a memory scrub, is in terms of memory addresses and in this approach the actual physical location of a given stored data value is not considered. In the present invention the issuance of an error detection maintenance request associated with at least one specific physical location means that error detection and correction may be more closely tied to the physical characteristics of the set associative storage device (e.g. number of ways, geometry, size etc.) and therefore may be better tailored to the requirements of a given set associative storage device (e.g. the statistical probability of an error occurring in a particular physical location in that device). In addition, by using of the maintenance request path, the present invention may advantageously make use of existing protocols for accessing specific physical locations such as those in place, for example, for accessing a particular set or way in a cache in order to perform other known maintenance operations.

Furthermore, being administered by the processing circuitry, this manner of checking the validity of data values stored in specific physical locations of a set associative storage device allows a more flexible approach to error detection in the set associative storage device. Firstly, by bringing the control over when such error detection checks occur to be dependent on an error detection maintenance request issued by the processing circuitry, a more finely tuned control over the power consumption of the system is realized. Secondly, by providing the processing circuitry with the error status information derived from the error detection operation performed by the error detection circuitry, improved monitoring and control of errors arising in the set associative storage device by the processing circuitry is achieved.

Whilst it will be appreciated that the maintenance circuitry could form a separate component of the data processing apparatus, in many embodiments it is advantageously simpler that the maintenance circuitry is contained within control logic associated with the storage device, the control logic controlling access to the storage device by the processing circuitry.

The dummy access to the at least one specific physical location in response to the error detection maintenance request causes the error detection circuitry to perform an error detection operation on the data value accessed. Whilst the data read out from the storage device may then not be required for any further purpose (in particular the processing circuitry is not requesting it as part of its normal data processing activities), in some embodiments the data processing apparatus further comprises a dummy access buffer for temporarily storing data read out from the storage device as a result of said at least one dummy access. This is particularly useful where further steps need to be performed in respect of that data value as part of the handling of the error detection maintenance request. This dummy access buffer could be provided as a dedicated component of the data processing apparatus. However in one embodiment the control logic comprises a buffer utilized during accesses by the processing circuitry when performing data processing operations (e.g. a linefill buffer, an eviction buffer, a write buffer, a holding/RAM retiming buffer etc.), that buffer being used to implement the dummy access buffer. This has clear space and resource saving advantages.

The manner in which the maintenance circuitry provides the processing circuitry with the error status information derived from the error detection operation may take a variety of forms, but in a preferred embodiment the data processing apparatus further comprises at least one status register for temporarily storing result information produced by the error detection operation performed by the error detection circuitry in respect of said at least one dummy access, the maintenance circuitry deriving the error status information from the result information in the at least one status register.

Given the flexibility inherent in the processing circuitry deciding when an error detection maintenance request should be issued, it will be appreciated that an error detection maintenance request may be issued under various conditions, but in preferred embodiments the processing circuitry issues the error detection maintenance request when predetermined criteria are met. These predetermined criteria, in one embodiment of the present invention, comprise at least one of: the processing circuitry being idle; a periodic timer signal being asserted; an interrupt signal being asserted; the data processing apparatus being connected to a mains electricity supply; and a battery status indicator being above a predetermined threshold.

In a simple configuration, the error detection circuitry may merely detect that an error is present in an accessed data value. However in one embodiment said error detection operation further comprises an error correction operation on the data value accessed. Thus, when a data value is accessed, if an error is determined to be present in that data value it is corrected where possible, and a corrected version of the data value is returned.

The error detection maintenance request issued by the processing circuitry may take a variety of forms. The error detection maintenance request may for example be a soft error detect request, in which event the at least one dummy access performed by the maintenance circuitry is a read access to the at least one specific physical location. This variety of error detection maintenance request therefore does not alter the content of the set associative storage device. In effect, by issuing this kind of request the processing circuitry is scanning the specified physical location to detect if an error is present.

The error detection maintenance request may be a soft error correct request, in which event the at least one dummy access performed by the maintenance circuitry is a read access to the at least one specific physical location followed by a write access to the at least one specific physical location. For this variety of error detection maintenance request the error detection operation further comprises an error correction operation on the data value accessed, such that the data value resulting from the read access has been error corrected and thus a corrected data value may then be written back to that at least one specific physical location. A soft error present at the at least one specific physical location will thus be corrected by this process.

The error detection maintenance request may be a hard error detect request, in which event the at least one dummy access performed by the maintenance circuitry is a read access to the at least one specific physical location followed by a write access to the at least one specific physical location followed by a further read access to the at least one specific physical location. This variety of error detection maintenance request is thus an extension of a soft error correct request, in that after the corrected data value has been written back to the at least one specific physical location, a further read access to that location is made. Since this follows the corrected data value being written to that location, if the error detection circuitry reports an error for this further read then a hard error has been detected, since the error appears not to be correctable by rewriting the data value and thus a fault may be associated with that particular storage location.

The error detection maintenance request may be a fault detect request, in which event the at least one dummy access performed by the maintenance circuitry is a read access to the at least one specific physical location, followed by a write access to the at least one specific physical location of the inverse of a data value resulting from said read access, followed by a further read access to the specific physical location, the result of the further read access being inverted and compared with said data value resulting from said read access. This variety of error detection maintenance request may thus be used by the processor to test the hardware integrity of the at least one specific physical location, and potentially identify a "hard stuck at" fault, wherein a given bit is permanently stuck at one value.

It will be appreciated that the processing circuitry may make use of the error status information in a variety of ways. In embodiments of the present invention, in dependence on the error status information the processing circuitry causes one or more further maintenance operations to be performed by the maintenance circuitry in respect of the storage device. For example, when an uncorrectable hard error is discovered, the processing circuitry may cause the maintenance circuitry to configure the storage device to no longer make use of the corresponding at least one specific physical location within the storage device.

Viewed from another aspect the present invention provides a method of performing error detection maintenance operations in respect of data values stored in a set associative storage device, comprising the steps of: storing data values in the set associative storage device for access by processing circuitry when performing data processing operations; performing, for each access to the storage device, an error detection operation on the data value accessed; issuing an error detection maintenance request from the processing circuitry to maintenance circuitry specifying at least one specific physical location within the storage device; in response to the error detection maintenance request, performing at least one dummy access to the at least one specific physical location within the storage device, as a result of which said error detection operation is performed; and providing the processing circuitry with error status information derived from the error detection operation performed by the error detection circuitry in respect of said at least one dummy access.

Viewed from a further aspect the present invention provides a data processing apparatus comprising: processing means for performing data processing operations; a set associative storage means for storing data values for access by the processing means when performing data processing operations; error detection means for performing, for each access to the storage means, an error detection operation on the data value accessed; and maintenance means associated with the storage means for performing one or more maintenance operations, wherein the processing means is arranged to issue an error detection maintenance request to the maintenance means specifying at least one specific physical location within the storage means, and the maintenance means is responsive to the error detection maintenance request to perform at least one dummy access to the at least one specific physical location within the storage means and to provide the processing means with error status information derived from the error detection operation performed by the error detection means in respect of said at least one dummy access.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
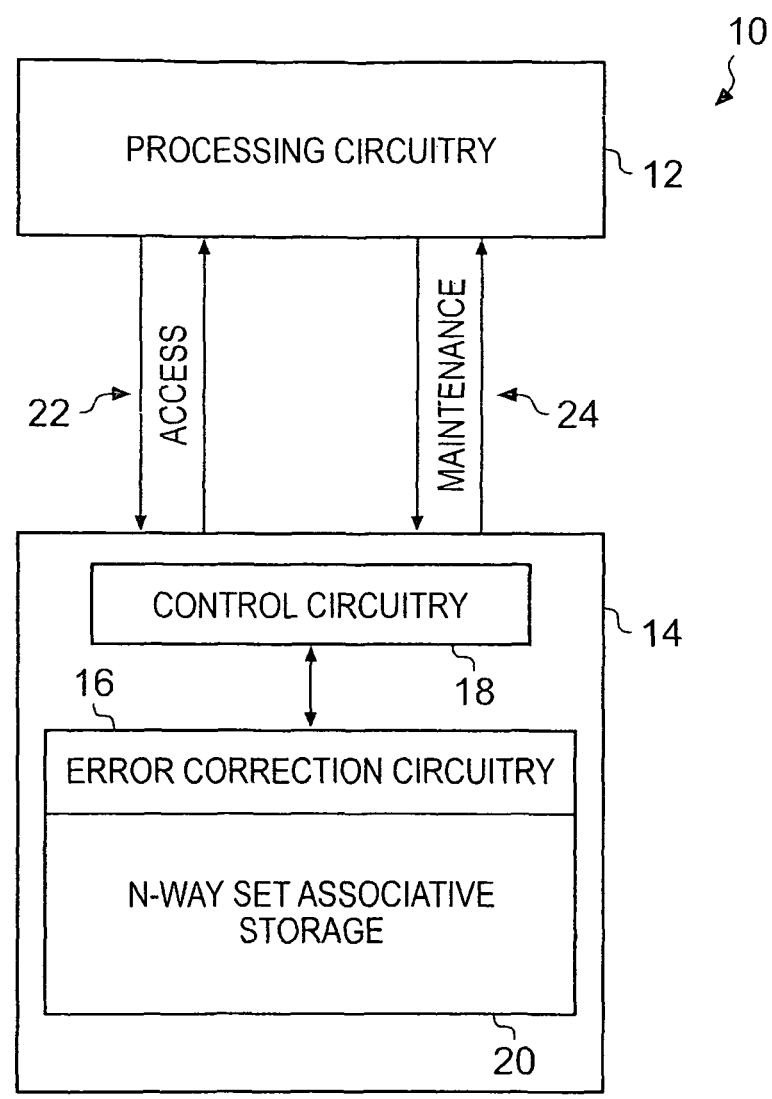
FIG. 1 is a block diagram of a data processing apparatus in accordance with one embodiment of the present invention.

FIG. 1 illustrates a data processing apparatus 10, composed of processing circuitry 12 and a set associative storage device 14. The set associative storage device 14 comprises error correction circuitry 16, control circuitry 18 and n-way set associative storage 20. The set associative storage device 14 stores data values for access by the processing circuitry 12 when performing data processing operations. The set associative storage device may take a variety of forms, but in one embodiment is a cache memory, providing the processing circuitry of a data processing apparatus with faster access to frequently used data values than possible when retrieving them from a main memory device. Furthermore, it is common that such a cache memory forms part of a cache memory hierarchy, leading from the processing circuitry to the main memory. When a requested data value is not found in the first cache (often referred to as a level 1 (L1) cache), the request is passed to the next level of the cache hierarchy (often referred to as a level 2 (L2) cache), ultimately reaching the main memory if the data value is not present in any of the cache levels. Such an arrangement is known in this technical field and is not described in more detail here. Hereinafter the discussion relates to a L1 cache, although the skilled person will understand that the present invention is equally applicable to further cache levels. Also, whilst the example embodiments described here relate to a cache memory, it will be understood that the set associative storage device could equally well be another kind of set associative storage device, such as a translation look-aside buffer, a tightly coupled memory, a branch target buffer of a branch prediction unit and so on.

The data values may comprise either instructions or data. When the data processing circuitry 12 requires a data value, it issues an access request over access path 22. This access request is received by control circuitry 18 within the set associative storage device 14, which provides the interface between access requests issued by the processing circuitry and the physical storage locations in the n ways of the n-way set associative storage 20. Before continuing with the description of FIG. 1, there follows a brief description of how this interface is provided, with reference to FIGS. 4 and 5.

Figure 5:
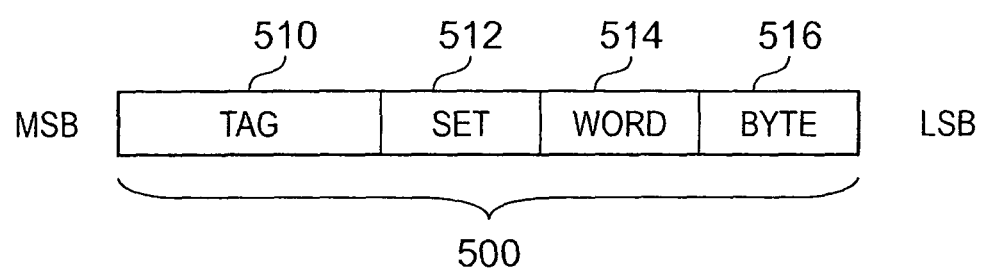
FIG. 5 illustrates the components of an address issued with an access request in accordance with one embodiment of the present invention.

FIG. 5 illustrates the contents of an address output by the processing circuitry 12 in association with an access request. The address 500 consists of a tag portion 510, and set, word and byte portions 512, 514, 516, respectively. The set portion 512 of the address 500 is used as an index to identify a particular set within the n-way set associative storage 20. Each of the lines in the set will then have stored in a tag array an associated tag value, which is compared with the tag portion 510 of the address 500 in order to detect whether there is a hit in the set associative storage device. The word portion 514 identifies a particular word within the line that is the subject of the access by the processing circuitry, whilst the byte portion 516 allows a particular byte within the word to be specified if required.

Figure 6:
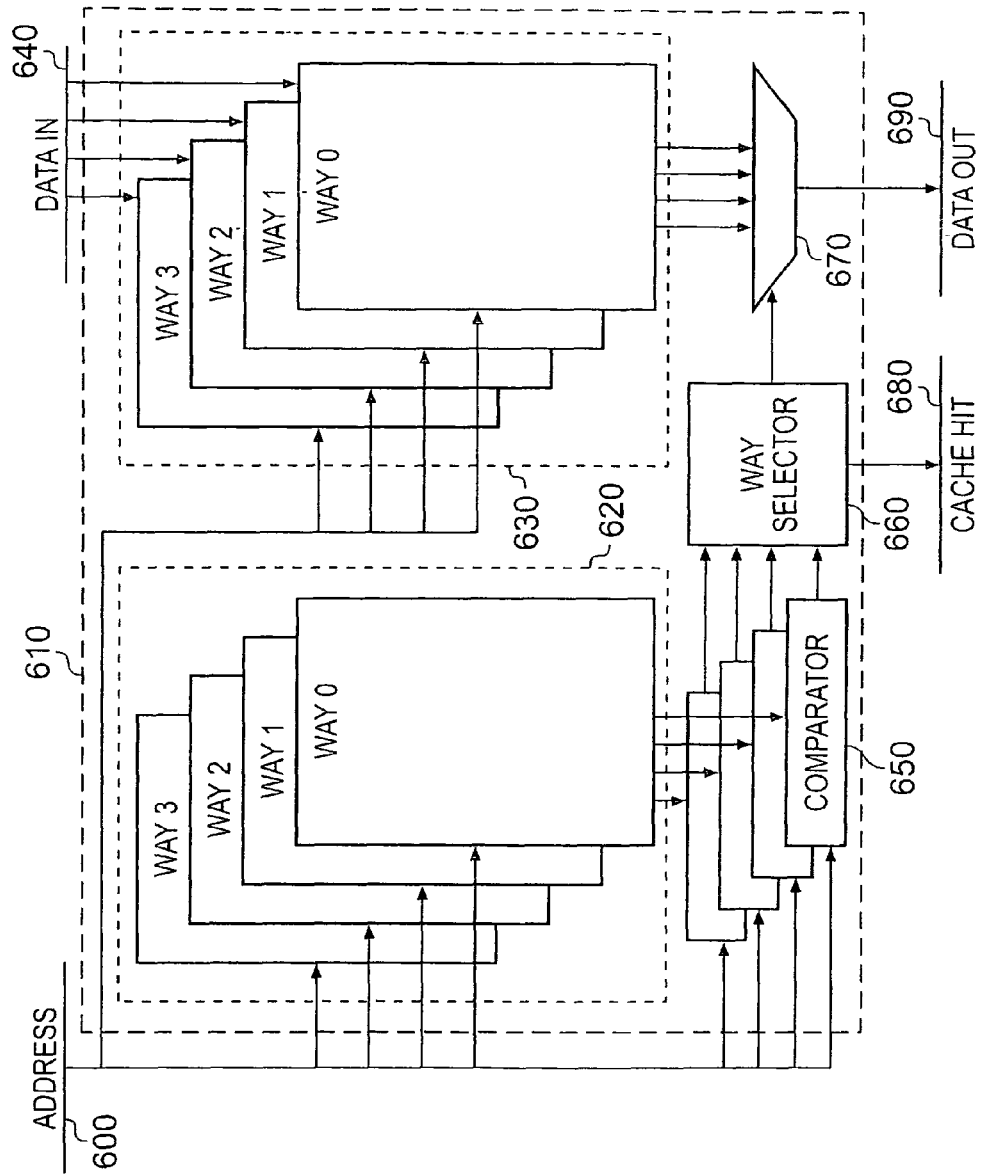
FIG. 6 is a block diagram illustrating components provided within the n-way set associative storage of FIG. 1 assuming an example of a 4-way set associative cache in accordance with one embodiment of the present invention.

FIG. 6 illustrates in more detail the operation within the n-way set associative storage 20 when a lookup operation for an access over access path 22 is performed within the set associative storage device 14. In this example the set associative storage device 14 is a 4-way set associative cache. The cache comprises four ways, a comparator 650 associated with each way, a way selector 660 and a multiplexer 670.

A tag RAM 620 is provided containing a tag memory for each way, and similarly a data RAM 630 is provided comprising a data memory for each way. The data memory of each way contains a plurality of cache lines that are arranged to store data values. Each set comprises one cache line in each way. Associated with each cache line is an entry in the associated tag memory in which a tag value is stored.

When a lookup operation is performed, the set portion 512 of the address is routed to each of the tag memories and data memories to identify the cache lines of the relevant set. Within the tag array 620, the tag values for the cache lines identified by the set portion 512 of the address are output to the comparators 650, which also receives the tag portion 510 of the address. Each comparator then compares the tag portion of the address with the tag value received from the corresponding way, and outputs the result of that comparison to the way selector 660. In the event that one of the comparators identifies a match, the way selector outputs a cache hit signal on path 680, this cache hit signal identifying the way in which the hit was detected. In the event that no matches are detected by the comparators, the way selector 660 instead outputs a cache miss signal.

Meanwhile, the set portion of the address 512 as routed to the data RAM 630 causes the relevant cache lines to be accessed within the set. In the event of a read access where a cache hit is detected, the way selector 660 will output a signal to the multiplexer 670 to identify which cache line's data should be output over path 690. The word and byte portions 514, 516 of the address can at this stage be used to identify the particular word or byte to be output.

In the event of a write access which hits in the cache, then if the write access is allowed to proceed then the relevant data can be forwarded to the appropriate way of the data RAM 630 over path 640 for storing in the relevant cache line.

In terms of the components illustrated in FIG. 1, it will therefore be understood that when the control circuitry 18 receives an access request for a data value, the cache control circuitry 18 performs the necessary tag RAM checks to detect whether a cache hit has occurred, and in the event of a cache hit allows the access to proceed with respect to the identified way. When the n-way set associative storage device 14 is accessed for a read operation, the error correction circuitry 16 verifies the data value retrieved and where possible corrects any errors found. Methods of performing error detection and correction, for example using parity bits or redundant information, are known in this technical field and will not be described further herein. Thus, data values requested by processing circuitry 12 are returned to it over access path 22, either having been found to be error-free or having been error corrected. In the event of a requested data value having an uncorrectable error, then a suitable error message may be returned from control circuitry 18 to processing circuitry 12 over path 22.

Additionally, the processing circuitry 12 may communicate with control circuitry 18 via maintenance path 24. This maintenance path enables the processing circuitry 12 to direct various aspects of the operation of the set associative storage device 14. For example, via path 24 the processing circuitry 12 may specify that certain data values stored in set associative storage 14 should not be overwritten (for example by forcing certain data values to be stored in a specific way and then locking down that way of the cache), it may configure the control circuitry 18 and so on.

The present invention makes use of maintenance path 24 to permit the processing circuitry 12 to issue an error detection maintenance request. This error detection maintenance request causes the control circuitry 18 to perform a dummy access to the at least one specific physical location specified in the error detection maintenance request. The manner in which a specific physical location is specified will depend on the construction of the cache and the error correction circuitry, but for example may explicitly specify a set and a way in the cache. The at least one specific physical location might refer to a single data value such as a 32-bit word, but could instead refer to a whole cache line and so on. Indeed, examining at least one specific physical location could form merely one part of a series of tests in a built-in self test (BIST) style operation. Hereinafter, for simplicity, the described examples refer to a single data value, but it will be understood that these examples apply equally well to a collection of data values. The control circuitry 18 accesses the set associative storage 14, such that the error correction circuitry 16 will be exercised and a correctable error in that data value will be corrected. The control circuitry 18 may further report back to the processing circuitry 12, providing error status information derived from the error detection operation performed by the error correction circuitry 16. It should be noted that a more direct access to the n-way set associative storage 20 is available to the control circuitry 18 than is illustrated by the connections shown in FIG. 5. In particular, the control circuitry 18 has the ability to specify any given physical location (whether part of tag array 620 or data array 630) and cause the data value stored at the specific physical location to be read out (potentially being error corrected by the error correction circuitry 16). This is not available based on an access request over path 22, since such an access request specifies an address which can map to any one of n possible physical locations within the cache (e.g. 4 possible locations for a 4-way set associative cache).

Figure 2:
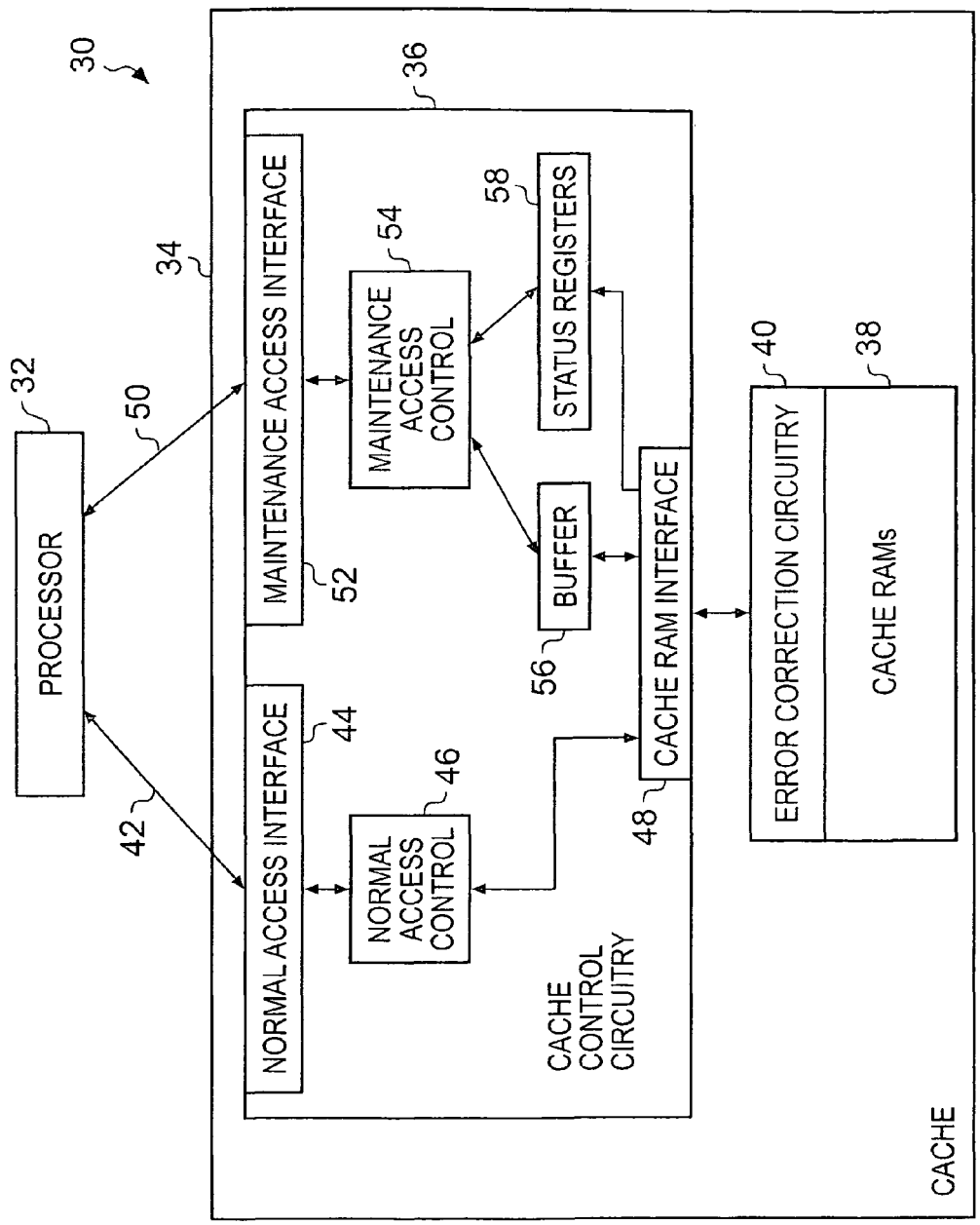
FIG. 2 schematically illustrates a cache memory incorporating control circuitry and error correction circuitry in accordance with one embodiment of the present invention.

FIG. 2 illustrates in more detail a data processing apparatus 30 in accordance with one embodiment of the present invention. Data processing apparatus 30 comprises a processor 32 and a cache 34. Cache 34 comprises cache control circuitry 36 and cache RAMs 38. Associated with cache RAMs 38 is the error correction circuitry 40.

Cache 34 is a set associative cache, meaning that the cache RAMs 38 are divided between a number of ways and any given data value is able based on its address to be stored in cache 34 in one possible cache line in each of the ways.

An access request for a data value stored in cache 34 by processor 32 is passed to cache 34 over access path 42 to the cache control circuitry 36. The access request is received by normal access interface 44 and passed on to normal access control circuitry 46. Normal access control circuitry 46 then asserts the corresponding control signals over cache RAM interface 48 to then access the cache RAMs 38. As described above in relation to FIG. 1, error correction circuitry 40 corrects errors that are found in data values accessed and where possible corrects them.

Cache control circuitry 36 also contains a path for responding to maintenance requests issued by processor 32. A maintenance request issued by processor 32 is passed to the cache control circuitry 36 over maintenance path 50. A maintenance access request is received in cache control circuitry 36 by maintenance access interface 52 and passed on to maintenance access control circuitry 54. Maintenance access control circuitry 54 is configured to control various aspects of the operation of the cache 34. When processor 32 issues an error detection maintenance request over maintenance path 50, the maintenance access control 54 causes the cache RAM interface 48 to issue the necessary control signals to the cache RAMs 38 such that a dummy access is performed to the specific physical location specified in the error detection maintenance request. A data value read out as part of such a dummy access is read out into buffer 56 (instead of being passed to normal access control 46 as per a normal access request). In addition, result information generated by the error correction circuitry 40 when the dummy access request is handled by the cache RAMs 38 is passed via cache RAM interface 48 to status registers 58. This result information stored in status registers 58 is then utilized by maintenance access control circuitry 54 to generate error status information which is passed back via maintenance access interface 52 and maintenance path 50 to the processor 32 in response to the error detection maintenance request.

The maintenance access control circuitry 54 is responsive to a range of error detection maintenance requests issued by processor 32. The nature of the error detection maintenance request issued by processor 32 depends on the level of error detection/correction that is required. A first type of error detection maintenance request is a soft error detect request. For this kind of error detection maintenance request the maintenance access control circuitry 54 causes the data value at the specified specific physical location in the cache RAMs 38 to be read out into buffer 56. The result information produced by the error correction circuitry 40 is also written to the status registers 58. Subsequently the maintenance access control circuitry 54 then passes error status information for this soft error detect request back to processor 30 over maintenance path 50. For a soft error detect request this error status information will either indicate that the data value at the specified physical location was read without error, i.e. the data value in the specific physical location is correct, or will indicate that the error correction circuitry 40 detected an error in the data value i.e. the data value stored at the specific physical location in the cache RAM contains an error.

Another kind of error detection maintenance request is a soft error correct request. For this kind of error detection maintenance request the maintenance access control circuitry 54 also causes a dummy access to the specific physical location (as for a soft error detect request). However, once the data value has been read into the buffer 56 the maintenance access control 54 causes the data value stored in buffer 56 to be written to the specific physical location in cache RAM 38. By this mechanism if an error was detected in the data value stored in the cache RAM and was correctable by the error correction circuitry 40, the data value written back to the specific physical location from buffer 56 should be error free, assuming that the error was indeed soft. Once the dummy read and the subsequent write have completed, the maintenance access control 54 provides the processor 32 with error status information derived from the result information stored in the status registers 58.

A third variety of error detection maintenance request is a hard error detect request. For this kind of maintenance request a dummy access to the specific physical location followed by a Write access to the specific physical location is carried out as for a soft error correct request. However, this is then followed by a further dummy read access to the specific physical location. If this second dummy read access to the specific physical location results in the error correction circuitry 40 again indicating that an error was detected for this read access, then a "hard error" may be deduced as present for this specific physical location, i.e. an error which cannot be corrected by rewriting the data value to that specific physical location. An example of such a hard error would be where due to a silicon defect a particular bit in the cache RAMs 38 is unchangeably fixed in one state (i.e. 0 or 1).

As a result of the error status information provided to the processing circuitry by the maintenance access control circuitry 54 in response to an error detection maintenance request, the processor 32 may issue other maintenance instructions to the maintenance access control 54. For example, when a hard error has been established at a particular physical location in the cache RAMs 38, the maintenance access control 54 can configure the cache control circuitry 36 to not make use of this region of the cache RAMs 38 in the future for normal cache accesses via normal access control circuitry 46.

Since the error detection maintenance requests are issued by the processing circuitry, the skilled person will appreciate that great flexibility is available to the programmer to control when error detection occurs. One particularly useful consequence of this flexibility is the control over the power expended by the data processing apparatus in performing error scrubbing activities in respect of the set associative cache 34.

Figure 3A:
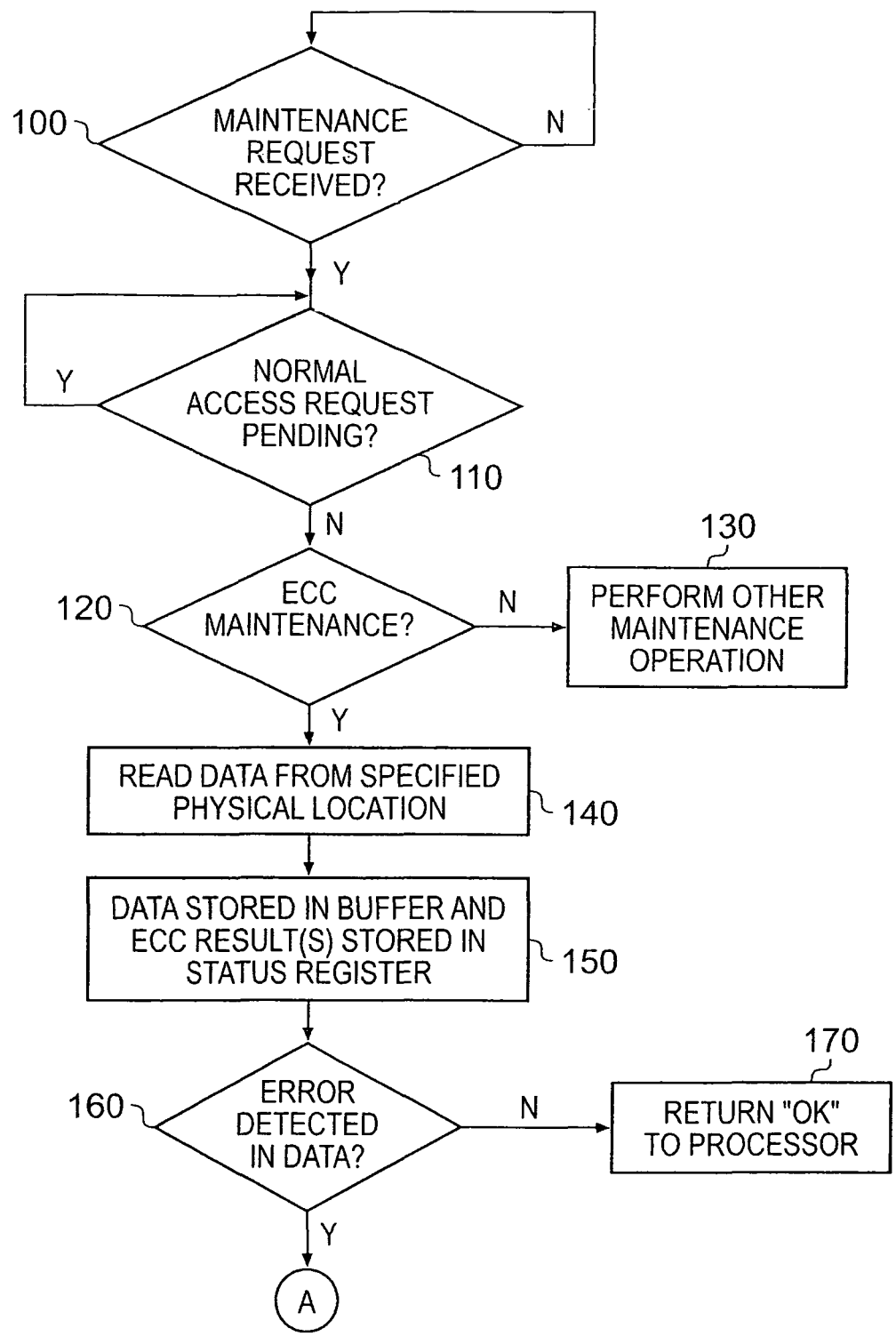
FIGS. 3A and 3B are a flow diagram schematically illustrating the operation of the cache control circuitry in accordance with one embodiment of the present invention.
Figure 3B:
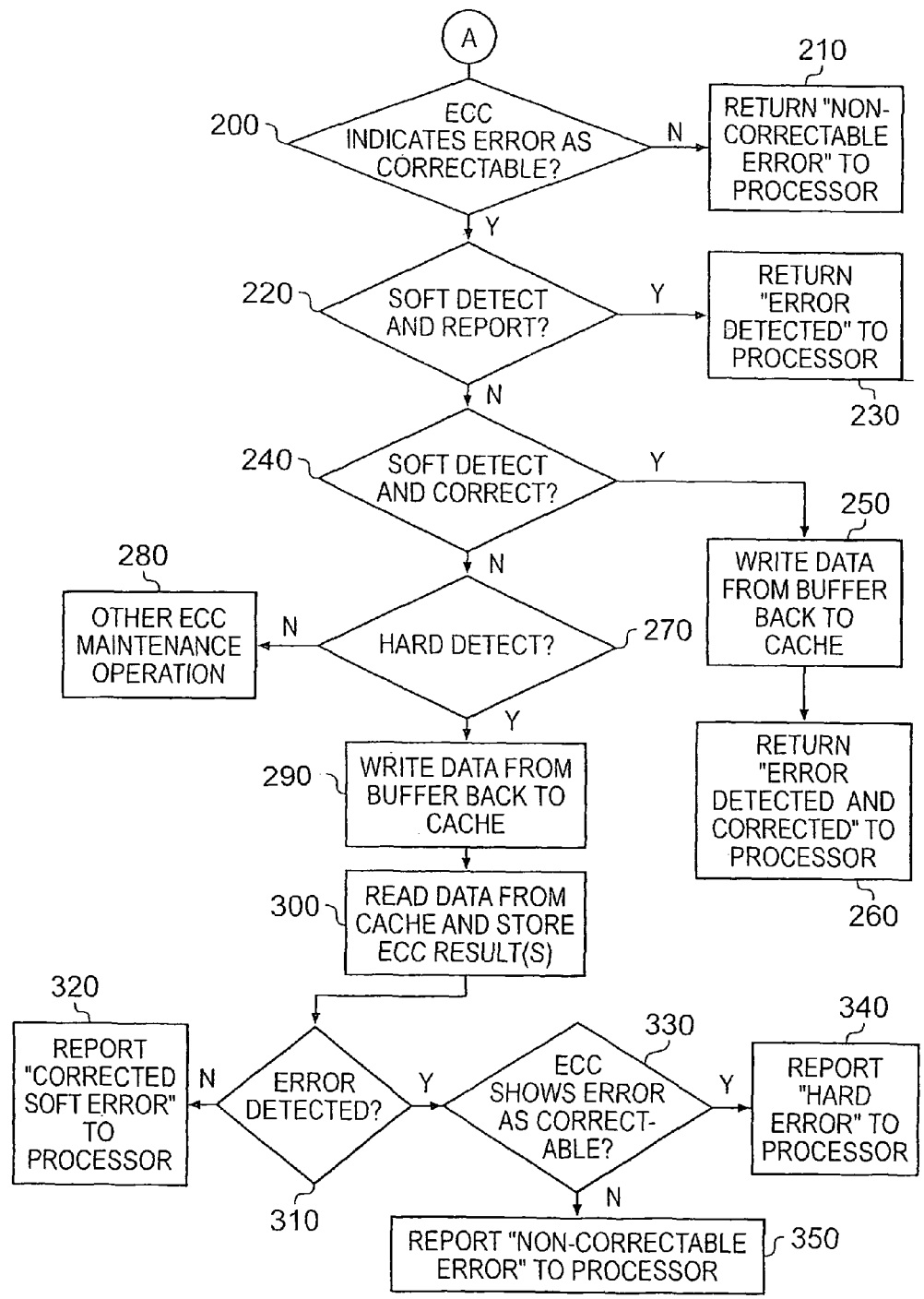

FIGS. 3A and 3B are a flow diagram schematically illustrating how error detection maintenance requests are handled by cache control circuitry. In FIG. 3A at step 100 the flow loops on itself until a maintenance request is received. When a maintenance request is received, then at step 110 it is checked whether there is a normal access request pending, i.e. currently being dealt with by the cache via the normal access route 42, 44, 46 and 48. If there is no normal access request pending, then at step 120 it is checked whether this maintenance request is an error detection/correction maintenance request (generically labelled 'ECC maintenance' in step 120). If not, then the flow passes to step 130 where another maintenance operation is performed by maintenance access control 54, e.g. configuring the cache. If, however, the maintenance request received is an error detection maintenance request, then the flow proceeds to step 140 and data stored at the specific physical location specified in the error detection maintenance request is read out. At step 150 this data is stored in buffer 56 and result information produced by the error correction circuitry 40 is stored in the status registers 58. At step 160 it is queried whether the result information stored in the status registers 58 indicates that an error was detected in the data read out of the specified physical location. If not, then the flow concludes at step 170 and the maintenance access control circuitry 54 can merely return an "OK" message as the error status information corresponding to the specified physical location to the processor 32.

If, however, an error has been detected, then the flow proceeds to step 200 (FIG. 3B). At step 200 it is queried whether the error correction circuitry 40 has indicated the detected error as correctable. If the error is indicated as not being correctable, then the flow concludes at step 210 and the maintenance access control returns a message of "non-correctable error" to processor 32 as the error status information. If the error correction circuitry, however, has indicated the error as correctable, then at step 220 if the error detection maintenance request is a soft error detect request (i.e. "soft detect and report") then at step 230 the maintenance access control circuitry 54 returns the message "error detected" to processor 30 as the error status information. If instead (step 240) the error detection maintenance request is a soft error correct request (i.e. "soft detect and correct") then the flow proceeds to step 250 and the data that has been read out into buffer 56 is written back to the specific physical location in the cache. Then at step 260 the maintenance access control circuitry 54 returns the message "error detected and corrected" to processor 32 as the error status information. If the error detection making this request is a hard error detect request then at step 290 the data that has been read out into buffer 56 is written back to the specific physical location in the cache RAMs 38. Thereafter at step 300 that specific physical location is read again, the data value being stored in buffer 56 and the result information from the error correction circuitry 40 being stored in the status registers 58. At step 310 it is then checked whether the error correction circuitry results information indicates that an error was detected on the second read from the specific physical location. If no error is indicated, then the flow concludes at step 320 and the maintenance access control 54 passes the message "corrected soft error" to the processor as the error status information. If, however, an error is detected, then at step 330 it is checked whether the result information produced by the error correction circuitry 40 stored in status registers 58 shows this error as correctable. If the error is indicated as correctable, then the maintenance access control circuitry 54 passes the message "hard error" back to the processor as the error status information (step 340). On the other hand, if the error correction circuitry indicates the error as non-correctable, then the message "non-correctable error" is passed to the processor 32 (step 350). In the event of such a non-correctable error occurring, remedial action (for example performing a system reset or entering a reduced functionality 'limp-home' mode) might then be initiated by the processor. Finally, if any other ECC maintenance operations are supported, then at step 270 if the error detection maintenance request is also not a hard error detect request (i.e. "hard detect") then the flow passes to step 280 where another kind of error correction circuitry maintenance operation is carried out.

The procedure described in FIGS. 3A and 3B refers to the situation where if an error is first detected (step 160 in FIG. 3A) and then various responses (depending on the nature of the error detection request) may be carried out. However it is also possible for the processor to proactively test specific physical locations more thoroughly, in order to test the hardware integrity of that specific physical location. This is performed by the cache control circuitry in response to a variety of error detection maintenance request described in the following as a fault detect maintenance request. The procedure carried out tests the specific physical location by: checking for errors in the data value stored there; overwriting the data value with its inverse and checking for errors in that value; and finally rewriting the original data value and checking for errors. In this manner, a "hard stuck at" fault may be identified, wherein a given bit is permanently stuck at one value. Were this value to happen to be appropriate for the data value stored, then the checks described in FIGS. 3A and 3B would not identify an error.

Figure 4:
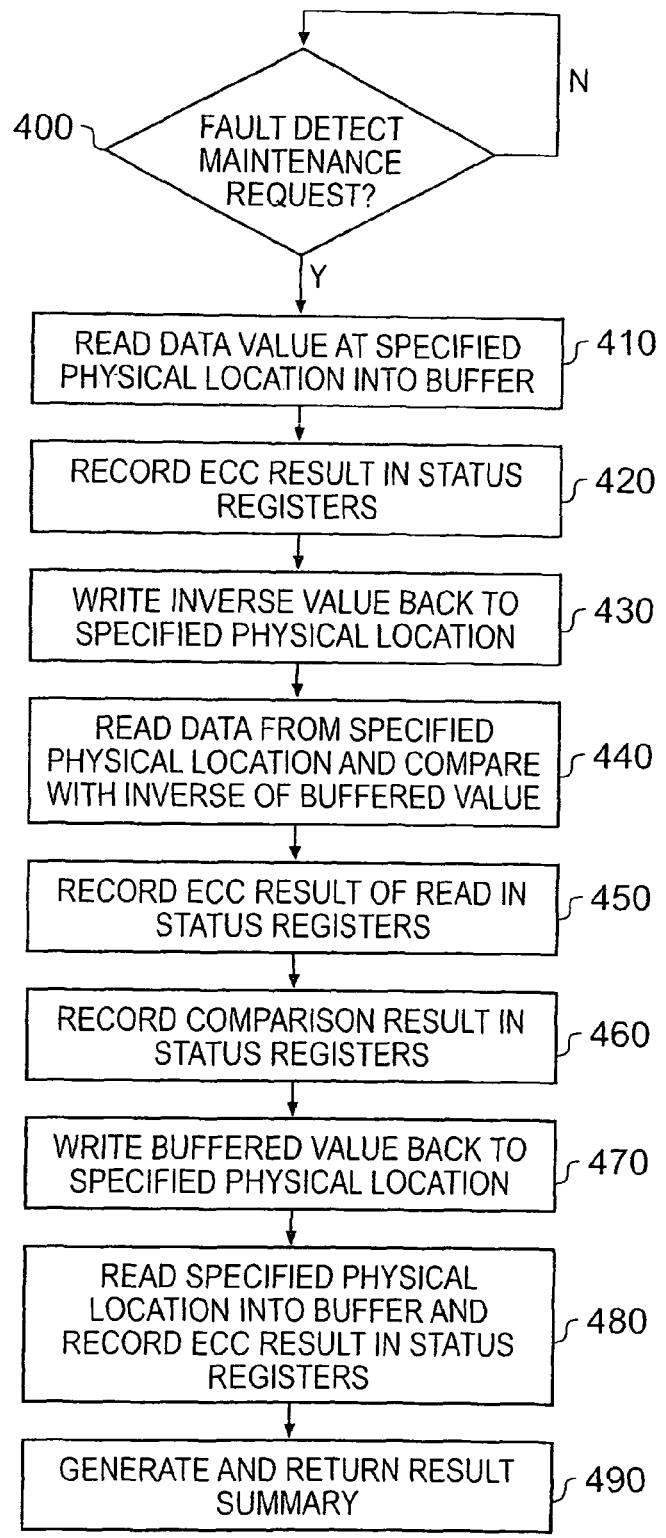
FIG. 4 is a flow diagram schematically illustrating the operation of the cache control circuitry when responding to a fault detect maintenance request in accordance with one embodiment of the present invention.

FIG. 4 illustrates the steps of a fault detect maintenance request. The flow begins at step 400 when a fault detect maintenance request is received and proceeds to step 410. At step 410 the data value stored at the specific physical location specified in the fault detect maintenance request is read out and stored in buffer 56. Also, (step 420) the output result of the error correction circuitry 40 is stored in the status registers 58. Next, at step 430 the inverse value of the data value stored in the buffer 56 at step 410 is written back to the specific physical location specified in the fault detect maintenance request (step 430). Once written there, at step 440 this specific physical location specified in the fault detect maintenance request is read out again. The newly read out value is then compared with the inverse of the data value stored in buffer 56. Note that this comparison may be performed on-the-fly as described in step 440 or if sufficient space is available in buffer 56 the data value read out at step 440 may also be stored in buffer 56 (or indeed within a further separate buffer) before the comparison takes place. The output result from the error correction circuitry 40 from the read at step 440 is, at step 450, recorded in the status registers 58. Furthermore, the result of the comparison at step 440 is also recorded in the status registers 58 at step 460. This comparison result may either indicate that there was no difference between the two data values or may indicate that a difference has occurred. Then at step 470 the data value stored in buffer 56 at step 410 is written back to the specific physical location specified in the fault detect maintenance request. Thereafter, at step 480 the specific physical location is again read out into buffer 56, the error correction circuitry result output also being stored in status registers 58. Finally, at step 490, the maintenance access control 54, on the basis of the error correction circuitry results and comparison results stored in the status registers 58, generates a result summary in response to the fault detect maintenance request and returns this to processor 32. It should be noted that the above-described procedure assumes that the error correction circuitry does not indicate a non-correctable error at step 420. Were this to occur then it may be preferred to abort the procedure at this point, rather than continuing and overwriting the data-value, potentially masking a non-correctable error.

According to the described procedure, by issuing a fault detect maintenance request the processor may test for hardware faults at specific physical locations in an n-way set associative storage device. A further extension to the described procedure involves the processor specifying a test pattern in the error detect maintenance request to be written to the specific physical location, to then be inverted and re-written to the specific physical location, in order to carry out more extensive tests on the hardware. Another further extension to the described procedure allows the processor to instruct the cache control circuitry to temporarily disable the error correction circuitry, in order to directly access the specific physical location, inserting a deliberate known error, to then re-enable the error correction circuitry and verify that it correctly identifies the deliberate error. This allows the processor to verify that the error correction circuitry is not suffering from a hard "stuck at" fault itself.

In conclusion, according to the present invention error detection and correction in a set associative storage device may be performed more flexibly and efficiently, by enabling the processing circuitry making use of the set associative storage device to issue an error detection maintenance request which specifies a specific physical location within the storage device. Maintenance circuitry associated with the set associative storage device is responsive to the error detection maintenance request to perform a dummy access to the specified specific physical location, thereby exercising error detection circuitry associated with the set associative storage device. Depending on the type of error detection maintenance request and the outcome of the error detection circuitry's activities, a detected error may be reported to the processing circuitry and attempts may be made to correct any detected error.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   processing circuitry for performing data processing operations;
   a set associative storage device having a plurality of specific physical locations and configured to store data values for access by the processing circuitry when performing data processing operations;
   error detection circuitry for performing, for each access to the storage device, an error detection operation on the data value accessed; and
   maintenance circuitry associated with the storage device for performing one or more maintenance operations;
   wherein the processing circuitry is configured to issue an error detection maintenance request to the maintenance circuitry specifying at least one of said specific physical locations within the storage device, and the maintenance circuitry is responsive to the error detection maintenance request to perform at least one dummy access to the at least one specific physical location within the storage device and to provide the processing circuitry with error status information derived from the error detection operation performed by the error detection circuitry in respect of said at least one dummy access.

2. A data processing apparatus as claimed in claim 1, wherein the maintenance circuitry is contained within control logic associated with the storage device, the control logic controlling access to the storage device by the processing circuitry.

3. A data processing apparatus as claimed in claim 1, further comprising a dummy access buffer for temporarily storing data read out from the storage device as a result of said at least one dummy access.

4. A data processing apparatus as claimed in claim 3, wherein the maintenance circuitry is contained within control logic associated with the storage device, the control logic controlling access to the storage device by the processing circuitry, wherein the control logic comprises a buffer utilised during accesses by the processing circuitry when performing said data processing operations, that buffer being used to implement the dummy access buffer.

5. A data processing apparatus as claimed in claim 1, further comprising at least one status register for temporarily storing result information produced by the error detection operation performed by the error detection circuitry in respect of said at least one dummy access, the maintenance circuitry deriving the error status information from the result information in the at least one status register.

6. A data processing apparatus as claimed in claim 1, wherein the processing circuitry issues the error detection maintenance request when predetermined criteria are met.

7. A data processing apparatus as claimed in claim 6, wherein the predetermined criteria comprise at least one of:
   the processing circuitry being idle;
   a periodic timer signal being asserted;
   an interrupt signal being asserted;
   the data processing apparatus being connected to a mains electricity supply; and
   a battery status indicator being above a predetermined threshold.

8. A data processing apparatus as claimed in claim 1, wherein said error detection operation further comprises an error correction operation on the data value accessed.

9. A data processing apparatus as claimed in claim 1, wherein said error detection maintenance request is a soft error detect request, and the at least one dummy access performed by the maintenance circuitry is a read access to the at least one specific physical location.

10. A data processing apparatus as claimed in claim 8, wherein said error detection maintenance request is a soft error correct request, and the at least one dummy access performed by the maintenance circuitry is a read access to the at least one specific physical location followed by a write access to the at least one specific physical location.

11. A data processing apparatus as claimed in claim 8, wherein said error detection maintenance request is a hard error detect request, and the at least one dummy access performed by the maintenance circuitry is a read access to the at least one specific physical location followed by a write access to the at least one specific physical location followed by a read access to the at least one specific physical location.

12. A data processing apparatus as claimed in claim 1, wherein said error detection maintenance request is a fault detect request, and the at least one dummy access performed by the maintenance circuitry is a read access to the at least one specific physical location, followed by a write access to the at least one specific physical location of the inverse of a data value resulting from said read access, followed by a further read access to the specific physical location, the result of the further read access being inverted and compared with said data value resulting from said read access.

13. A data processing apparatus as claimed in claim 1, wherein in dependence on the error status information the processing circuitry causes one or more further maintenance operations to be performed by the maintenance circuitry in respect of the storage device.

14. A method of performing error detection maintenance operations in respect of data values stored in a set associative storage device having a plurality of specific physical locations, said method comprising the steps of:
   storing data values in the set associative storage device for access by processing circuitry when performing data processing operations;
   performing, for each access to the storage device, an error detection operation on the data value accessed;
   issuing an error detection maintenance request from the processing circuitry to maintenance circuitry specifying at least one of said specific physical locations within the storage device;
   in response to the error detection maintenance request, performing at least one dummy access to the at least one specific physical location within the storage device, as a result of which said error detection operation is performed; and
   providing the processing circuitry with error status information derived from the error detection operation performed by the error detection circuitry in respect of said at least one dummy access.

15. A data processing apparatus comprising:
   processing means for performing data processing operations;
   a set associative storage means for storing data values for access by the processing means when performing data processing operations, said storage means having a plurality of specific physical locations;

error detection means for performing, for each access to the storage means, an error detection operation on the data value accessed; and maintenance means associated with the storage means for performing one or more maintenance operations;

wherein the processing means is configured to issue an error detection maintenance request to the maintenance means specifying at least one of said specific physical locations within the storage means, and the maintenance means is responsive to the error detection maintenance request to perform at least one dummy access to the at least one specific physical location within the storage means and to provide the processing means with error status information derived from the error detection operation performed by the error detection means in respect of said at least one dummy access.

* * * * *